Patented July 13, 1954

2,683,705

UNITED STATES PATENT OFFICE 2,683,705

POLYMERIZATION OF α-CHLOROACRYLATES

Harry D. Anspon, Easton, and Frank E. Pschorr, Tatamy, Pa., assignors to General Aniline & Film Corporation, New York, N. Y., a corporation of Delaware No Drawing. Application May 16, 1952, Serial No. 288,334

12 Claims. (Cl. 260—89.5)

This invention relates to an improved method for polymerizing (monomeric) α-chloroacrylate esters to produce improved polymers therefrom.

When methyl α-chloroacrylate is polymerized in plate glass casting cells by irradiation with ultra-violet light and the shorter wave-lengths of visible light, the polymerization is accompanied by the formation of strains which are evident as strain patterns when viewed under polarized light. Most frequently, these patterns appear as dark "maltese crosses" outlined by bright birefringent areas ("star-strain" patterns). Inside the large majority of these strain patterns may be found small dust particles, some of which are discernible with the naked eye, but most of which are visible only under a microscope. In normal light these strain patterns are invisible and the smooth polished polymer sheets appear optically perfect. To obtain the shapes and contours desired in most applications of thermoplastic polymer sheets, they are heated at an elevated temperature, called the forming temperature, at which temperature they become soft and plastic, and then are blown or bent to the desired shape. When methyl α-chloroacrylate polymer sheets containing strain patterns were heated to 160° C. (the forming temperature for methyl α-chloroacrylate polymer), the strains were relieved by movement of the hot plastic polymer. After cooling the sheet, it was observed, under polarized light, that the strain patterns originally present had either disappeared or diminished in intensity. However, in their place had arisen readily visible distortions in the originally smooth polished surfaces of the sheet. These distortions, caused by movement of the polymer to relieve the strains originally present, appeared as protrusions or depressions in the originally smooth polished polymer surfaces.

For most applications, the optical requirements of the formed sheets, which had possessed strains, completely ruled out the use of the distorted sheets. It was essential that strains be eliminated from cast methyl α-chloroacrylate polymer sheet if its utility as a transparent thermoplastic polymer was to be realized. These strains probably are formed around dust particles because of the effect of these particles on the polymerization of adjacent monomer.

The development of strains during polymerization of methyl α-chloroacrylate may be due to the high reactivity of this monomer which might make it sensitive to foreign particles or to a slight tendency for the monomer to orient itself with the formation of spots of semi-crystalline polymer or a combination of these effects.

Although the foregoing passage only mentions ultraviolet light polymerization as causing strain pattern development, it should not be concluded that other methods of polymerization do not give rise to strain patterns. Even catalyst polymerizations run in the absence of light gave rise to strain patterns although there were usually fewer strains developed with ordinary catalytic methods than with light polymerization.

It should be noted that the problem of strain development during polymerization is practically non-existent in the polymerization of sheets of methyl methacrylate polymer. Ordinary catalyst polymerizations yield strain-free polymer sheets even when the methyl methacrylate polymerization is run in casting cells containing fine dust particles.

It is an object of this invention to provide a new improved method for polymerizing α-chloroacrylate monomers and to produce thereby polymers with improved properties. Other objects and advantages will appear as the description proceeds.

These objects are obtained by the instant invention which involves polymerization of a monomeric ester of α-chloroacrylic acid in the presence of a polymerization catalyst of the formula:

or

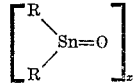

wherein R is selected from the group consisting of alkyl, alkenyl, cycloalkyl, aralkyl, and aryl radicals, R' is selected from the group consisting of alkyl, alkenyl, cycloalkyl, aralkyl, aryl, acyloxy and alkoxy radicals, $x$ is an integer having a value of at least 1 such as from 1 to 100, and acyloxy and alkoxy radicals are not both present in the same molecule.

As representative of such polymerization catalysts may be mentioned dibutyl tin diacetate. The use of dibutyl tin diacetate for the polymerization of methyl α-chloroacrylate is extremely important in the production of methyl α-chloroacrylate polymer sheets because its use enables one to prepare strain-free polymers and because it is an effective low temperature catalyst so that the polymerization can be carried out at room temperature. The fact that this catalyst functions at room temperature is of great practical importance in the production of methyl α-chloroacrylate polymers, since its use allows the production of polymer sheets without resort to large, elaborate, temperature controlled baths. In place of these baths, simple storage racks at room temperature are satisfactory for carrying out the polymerization of methyl α-chloroacrylate in glass casting cells.

It should be noted that dibutyl tin diacetate will not prevent the formation of strains around large particles of foreign matter such as grains of sand, but it will prevent the formation of strains around small dust particles. Of course, in casting a transparent polymer, it is necessary to take what might be termed ordinary precautions to prevent incorporation of large pieces of foreign matter in a plastic whose optical properties are to be utilized. However, it is much more difficult to prevent the incorporation of very fine dust particles in casting cells even when using special air cleaning equipment in the rooms in which the cells are assembled. For example, dust and dirt from a worker's clothing will get into a casting cell even when it is assembled in an otherwise dust-free room.

Carefully purified methyl α-chloroacrylate is extremely reactive and when rather large amounts of benzoyl peroxide are used as catalyst (0.6%), the monomer will polymerize at room temperature. Dibutyl tin diacetate in this same concentration will polymerize methyl α-chloroacrylate in a shorter time at room temperature. At lower concentrations (0.06%), dibutyl tin diacetate will also polymerize methyl α-chloroacrylate at a much greater rate at room temperature than the same concentration of benzoyl peroxide. Although dibutyl tin diacetate does polymerize methyl α-chloroacrylate at room temperature much faster than benzoyl peroxide, the dibutyl tin diacetate is a much safer catalyst to employ for it is not nearly as susceptible to the effect of temperature changes on its rate of initiation of polymerization as is benzoyl peroxide. This property is very important in the preparation of sheet castings. Since heat is evolved during polymerization, it is highly desirable to employ a catalyst whose rate of initiation of polymerization will not change markedly with slight temperature rises caused by the heat of polymerization. With benzoyl peroxide a slight temperature rise causes more rapid polymerization of the monomer principally because of the greater catalyst activity. The more rapid polymerization in turn causes more rapid heat evolution and the process soon builds up to a point where the polymerization is out of control and a casting containing gas bubbles of irregular size is obtained. With dibutyl tin diacetate, control of the polymerization is much more easily achieved since slight temperature changes chiefly affect the monomer rate of polymerization and have little effect on the catalyst rate of initiation of polymerization.

While the above description has been limited to a discussion of methyl α-chloroacrylate as the monomer and dibutyl tin diacetate as the polymerization catalyst, it will be understood that the same considerations apply to other monomers and polymerization catalysts of the type hereinafter described.

While the process of the invention is particularly advantageous when applied to methyl α-chloroacrylate, other esters of chloroacrylic acid may be polymerized in accordance with the invention, as for example, alkyl esters such as ethyl, propyl, isopropyl, butyl, amyl, isoamyl, hexyl, octyl or lauryl esters; alkenyl esters such as allyl, methallyl or crotyl esters; polyhydric alcohol esters such as the ethylene glycol or 1,4-butanediol esters; cycloalkyl esters such as cyclohexyl or methylcyclohexyl esters; aralkyl esters such as the benzyl esters; aryl esters such as phenyl or tolyl esters; and heterocyclic esters such as the tetrahydrofufuryl ester. The liquid monomer may, of course, contain binders and fillers such as fibrous material to achieve decorative and reinforcing effects in addition to other desirable agents.

While dibutyl tin diacetate has been found particularly effective as the polymerization catalyst, other tin compounds coming within the scope of the formulas set forth hereinbefore may also be employed, as for example, dimethyl tin oxide, diethyl tin oxide, dibutyl tin oxide, dioctyl tin oxide, dilauryl tin oxide, diphenyl tin oxide, dibenzyl tin oxide, dicyclohexyl tin oxide, di-allyl tin oxide, trimethylbutoxy tin, tributylbutoxy tin, trioctylmethoxy tin, triallylmethoxy tin, tributyl tin laurate, trimethyl tin acetate, diallyl-oxydibutyl tin, dibutoxydibutyl tin, dibutylethylenedioxy tin

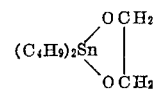

dibutylbis(octyloxy) tin, dibutylbis(benzyloxy) tin, diethylbis(furfuryloxy) tin

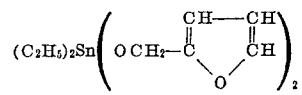

dibutyl tin maleate

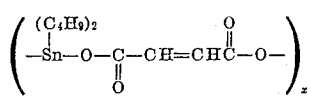

or

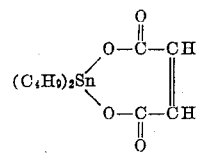

dibutyl tin diacetate $(C_4H_9)_2Sn(OOCCH_3)_2$, dimethyl tin diacetate $(CH_3)_2Sn(OOCCH_3)_2$, dibutyl tin dilaurate $(C_4H_9)_2Sn(OOCC_{11}H_{23})_2$, dicyclohexyl tin diacetate, dibenzyl tin diacetate, methyltributoxy tin, phenyltriethoxy tin, ethyl tin tributyrate, methyl tin tripropionate, octyl tin tricaproate, propyl tin trioleate, tetramethyl tin, tetraphenyl tin, tetra(p-tolyl) tin, methyltriphenyl tin, tetradodecyl tin (tetralauryl tin), dibutyldiphenyl tin, phenyltriallyl tin, tetrabutyl tin, and the like.

The aforementioned tin compounds may be employed in the process of the invention in amounts of about .001 to 2% and preferably from about .06 to .6% by weight of the monomer. It will be understood that said compounds may be employed alone or in conjunction with other polymerizing agents such as heat, ultra-violet light and/or other catalysts.

It should be pointed out that although the term "catalyst" is defined as a substance which alters the speed of a reaction without suffering permanent change, the term has been applied to the tin compounds of the instant invention in its generally employed sense as meaning any compound which initiates, promotes or catalyzes a chemical reaction. Thus, benzoyl peroxide is generally referred to as a polymerization catalyst even though it is not recoverable, in contradistinction to BF$_3$·hydrate catalysts. This definition is deemed advisable in the instant case since it has not been ascertained whether or not the tin compounds of the invention suffer a permanent change during the polymerization.

The following examples illustrate the invention and are not to be regarded as limitative. The proportions are by weight unless otherwise indicated.

EXAMPLE 1

To cold, dry, freshly vacuum-distilled methyl α-chloroacrylate monomer was added 0.2% dibutyl tin diacetate and 0.01% Aerosol OT (dioctyl sodium sulfosuccinate) as a mold release agent. This solution was poured at low temperature into a 9" x 9" x 1/8" casting cell not constructed in a dust-free room, allowed to stand at room temperature for 26½ hours in diffuse daylight and then heated in increments over a period of 8 hours to 120° C. and held at that temperature for 24 hours. The clear and colorless polymer sheet obtained showed practically no "star-strain" patterns when examined under polarized light.

EXAMPLE 2

Methyl α-chloroacrylate monomer which had been vacuum-distilled and which contained 0.032% di-tert.-butyl peroxide, 0.024% DC-550 (Dow-Corning phenyl methyl silicone oil as a mold release agent) and 0.12% dibutyl tin diacetate was poured into a 14" x 14" x 1/8" casting cell. This cell had not been constructed in a dust-free room but precautions were taken to keep as little dust as possible from settling on the casting surfaces of the mold. The cell was allowed to stand at room temperature in diffuse light for 67 hours, then heated for 72 hr. at 59° C. and 24 hr. at 120° C. The finished polymer sheet showed no "star-strain" patterns when examined under polarized light.

EXAMPLE 3

To methyl α-chloroacrylate monomer purified by vacuum distillation was added 0.4% tetrabutyl tin and 0.04% DC-550. A portion of this solution was allowed to come to room temperature (21° C.) and was then poured through the air into a cellophane type sausage casing in which this monomer solution was polymerized in the dark while heating for 63 hours at 59-60° C. and finally 24 hours at 119° C. Despite the fact that this monomer was poured at room temperature, the relatively strain-free polymer obtained was clear and colorless.

EXAMPLE 4

To methyl α-chloroacrylate monomer which had been flash vacuum distilled was added 0.024% DC-550 and 0.12% dibutyl tin diacetate. This solution was poured into a 14" x 14" x 1/4" casting cell which had been assembled in a nearly dust-free room. The filled cell was allowed to polymerize by standing in the dark at room temperature for 52¼ hours and was then cured for 9 hours at 120° C. No "star-strains" were observed when the finished polymer sheet was examined under polarized light.

EXAMPLE 5

A 14" x 14" x 1/4" casting cell, constructed in a nearly dust-free room, was filled with methyl α-chloroacrylate monomer which had been flash vacuum distilled and to which had been added 0.032% di-tert.-butyl peroxide, 0.024% DC-550, and 0.12% dibutyl tin diacetate. This cell, in a horizontal position, was irradiated from below with ultra-violet light. It required 13½ hr. to polymerize this sheet, after which it was heated for 23 hours at a temperature of 120° C. The general appearance of the finished polymer sheet, when examined under polarized light, was excellent for it was free of strain patterns.

EXAMPLE 6

In this experiment a large 4' x 6' x 1/4" glass casting cell, assembled in a nearly dust-free room, was filled with 22 liters of flash vacuum-distilled methyl α-chloroacrylate monomer to which had been added 0.06% dibutyl tin diacetate and 0.032% di-tert.-butyl peroxide. The solution was polymerized for 12 hr. at 40° C. and then heated at 121° C. for 24 hr. The finished polymer sheet, when examined under polarized light, showed no general strain patterns and no "star-strain" patterns.

EXAMPLE 7

Four 1 oz. glass stoppered bottles were carefully cleaned, dried and filled respectively with pure methyl α-chloroacrylate monomer and with the same monomer containing 0.6% of one of the catalysts of the invention. The bottles were then kept in the dark at room temperature (21° C.) and observations made at intervals to ascertain the progress of polymerization in each bottle. The results are shown in the following table:

*Table*
CONDITION OF SAMPLE WHEN EXAMINED AFTER STANDING

| Monomer Sample | 2¼ hr. at 26° C. | 4 hr. at 26° C. | 6¼ hr. at 26° C. | 23 hr. at 26° C. |
|---|---|---|---|---|
| MACA | Watery | Watery | Watery | Very viscous; still flows. |
| MACA$_1$ | Cloudy and viscous | Light gel, cloudy, liquid on top. | Firm gel, cloudy | Fully polymerized. |
| MACA$_2$ | ___do___ | Same as MACA$_1$ | ___do___ | Do. |
| MACA$_3$ | Slightly viscous and cloudy. | Slightly viscous | Barely flows; smooth viscosity. | Do. |

MACA = methyl α-chloracrylate monomer alone.
MACA$_1$ = MACA + 0.6% dibutyl tin diacetate.
MACA$_2$ = MACA + 0.6% dibutyl tin dilaurate.
MACA$_3$ = MACA + 0.6% tetrabutyl tin.

The following examples are given for comparative purposes:

EXAMPLE 8

Methyl α-chloroacrylate monomer which had been vacuum distilled and which contained 0.02% benzoyl peroxide was poured into a 14" x 14" x 1/8" casting cell not constructed in a dust-free room. The cell was allowed to stand at room temperature while covered with aluminum foil to keep out any light, for 144 hr. (20-25° C.) and then heated for 24 hr. at 121–122° C. The finished polymer sheet contained "star-strain" patterns when examined under polarized light.

EXAMPLE 9

To purified methyl α-chloroacrylate monomer was added 0.05% DC–550 and 0.05% benzoyl peroxide. This monomer was poured into a 30″ x 30″ x ¼″ casting cell which had been constructed in a nearly dust-free room. The cell was irradiated for 19½ hours by six fluorescent sunlamps (Westinghouse 40 w., 110 v.) and then heated in an oil bath for 24 hr. at 120° C. The finished polymer sheet showed many "star-strains" and a slight "wave pattern" when examined under polarized light.

EXAMPLE 10

To purified methyl α-chloroacrylate monomer was added 0.32% di-tert.-butyl peroxide and 0.024% DC–550. This monomer was poured into a 30″ x 30″ x ¼″ casting cell which had been constructed in a nearly dust-free room. The mold was heated for 10¾ hr. at 60–61° C. and then cured for 24 hr. at 120° C. Many "star-strains" were noted in the finished polymer sheet when it was examined under polarized light.

EXAMPLE 11

Purified methyl α-chloroacrylate monomer to which had been added .05% DC–550 and .05% di-tert.-butyl peroxide was poured into a casting cell not constructed in a dust-free atmosphere. The cell was heated for 113 hr. at 57–60° C. and then heated for 24 hr. at 120° C. The finished polymer sheet contained many "star-strain" patterns when examined under polarized light.

EXAMPLE 12

Vacuum-distilled methyl α-chloroacrylate monomer containing 0.05% DC–550 and 0.06% di-tert.-butyl peroxide was poured into a casting cell not constructed in a dust-free room. The cell was allowed to stand at room temperature in the presence of diffused light until polymerized and then heated for 72 hr. at 59° C. and 24 hr. at 120° C. Many "star-strain" patterns could be observed when the finished polymer sheet was examined under polarized light.

EXAMPLE 13

Vacuum-distilled methyl α-chloroacrylate monomer containing 0.02% Porofor N (azo-bis-isobutyronitrile) was poured into a 14″ x 14″ x ⅛″ casting cell not constructed in a dust-free room. The cell was covered with aluminum foil to keep out light, and then allowed to stand at room temperature for 41 hr. (20–25° C.), after which it was heated for 7 hours at 42–49° C., and finally for 24 hr. at 121–122° C. The finished polymer sheet contained "star-strain" patterns when examined under polarized light.

EXAMPLE 14

To purified methyl α-chloroacrylate was added 0.05% DC–550. This monomer mixture was poured into a 30″ x 30″ x ¼″ casting cell which had been constructed in a nearly dust-free room. The monomer in the cell was polymerized by irradiation with Westinghouse fluorescent sunlamps (40 w., 110 v.) placed about 12″ from the bottom glass plate of the mold. The finished polymer sheet was examined under polarized light, and quite a few "star-strains" along with a general slight strain pattern were evident.

Various modifications and variations of this invention will be obvious to a person skilled in the art and such variations and modifications are to be regarded as within the purview of this application and the spirit and scope of the appended claims.

We claim:

1. A process comprising polymerizing an α-chloroacrylic acid ester in the presence of a compound selected from the group consisting of

and

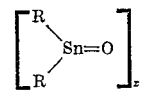

wherein R is selected from the group consisting of alkyl, alkenyl, cycloalkyl, aralkyl, and aryl radicals, R' is selected from the group consisting of alkyl, alkenyl, cycloalkyl, aralkyl, aryl, acyloxy and alkoxy radicals, x is an integer having a value of at least 1 and acyloxy and alkoxy radicals are not both present in the same molecule.

2. A process comprising polymerizing methyl α-chloroacrylate in the presence of a compound selected from the group consisting of

and

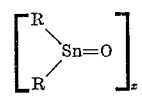

wherein R is selected from the group consisting of alkyl, alkenyl, cycloalkyl, aralkyl, and aryl radicals, R' is selected from the group consisting of alkyl, alkenyl, cycloalkyl, aralkyl, aryl, acyloxy and alkoxy radicals, x is an integer having a value of at least 1 and acyloxy and alkoxy radicals are not both present in the same molecule.

3. A process comprising polymerizing methyl α-chloroacrylate in the presence of dibutyl tin diacetate.

4. A process comprising polymerizing methyl α-chloroacrylate in the presence of dibutyl tin dilaurate.

5. A process comprising polymerizing methyl α-chloroacrylate in the presence of tetrabutyl tin.

6. A process comprising polymerizing methyl α-chloroacrylate in the presence of dibutyl tin oxide.

7. A process comprising polymerizing an α-chloroacrylic acid ester in the presence of a compound selected from the group consisting of

and

wherein R is selected from the group consisting of alkyl, alkenyl, cycloalkyl, aralkyl, and aryl radicals, R' is selected from the group consisting of alkyl, alkenyl, cycloalkyl, aralkyl, aryl, acyloxy and alkoxy radicals, x is an integer having a value of at least 1 and acyloxy and alkoxy radicals are not both present in the same molecule, as the sole polymerization catalyst.

3. A process comprising polymerizing methyl α-chloroacrylate in the presence of a compound selected from the group consisting of

and

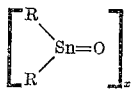

wherein R is selected from the group consisting of alkyl, alkenyl, cycloalkyl, aralkyl, and aryl radicals, R' is selected from the group consisting of alkyl, alkenyl, cycloalkyl, aralkyl, aryl, acyloxy and alkoxy radicals, $x$ is an integer having a value of at least 1 and acyloxy and alkoxy radicals are not both present in the same molecule, as the sole polymerization catalyst.

9. A process comprising polymerizing methyl α-chloroacrylate in the presence of dibutyl tin diacetate, as the sole polymerization catalyst.

10. A process comprising polymerizing methyl α-chloroacrylate in the presence of dibutyl tin dilaurate, as the sole polymerization catalyst.

11. A process comprising polymerizing methyl α-chloroacrylate in the presence of tetrabutyl tin, as the sole polymerization catalyst.

12. A process comprising polymerizing methyl α-chloroacrylate in the presence of dibutyl tin oxide, as the sole polymerization catalyst.

References Cited in the file of this patent
UNITED STATES PATENTS

| Number | Name | Date |
| --- | --- | --- |
| 2,307,092 | Yngve | Jan. 5, 1943 |
| 2,307,157 | Quattlebaum et al. | Jan. 5, 1943 |
| 2,481,086 | Cleverdon et al. | Sept. 6, 1949 |
| 2,563,772 | Cheney | Aug. 7, 1951 |
| 2,592,926 | Mack et al. | Apr. 15, 1952 |